(12) United States Patent
Han et al.

(10) Patent No.: US 11,041,092 B2
(45) Date of Patent: Jun. 22, 2021

(54) SURFACE COATING MATERIAL AND FILM AND STACKED STRUCTURE AND DISPLAY DEVICE

(71) Applicant: Samsung Electronics Co., Ltd., Suwon-si (KR)

(72) Inventors: Jung Im Han, Yongin-si (KR); Kyoung Min Min, Suwon-si (KR); Byung Ha Park, Yongin-si (KR); Dmitry Androsov, Suwon-si (KR); Won Cheol Jung, Seoul (KR); Eun Seog Cho, Yongin-si (KR); Fedosya Kalinina, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 14 days.

(21) Appl. No.: 16/436,106

(22) Filed: Jun. 10, 2019

(65) Prior Publication Data
US 2020/0056068 A1   Feb. 20, 2020

(30) Foreign Application Priority Data
Aug. 20, 2018   (KR) ........................ 10-2018-0096657

(51) Int. Cl.
    *C09D 183/08*    (2006.01)
    *G02B 1/14*      (2015.01)
    *C08G 77/26*     (2006.01)
(52) U.S. Cl.
    CPC .......... *C09D 183/08* (2013.01); *C08G 77/26* (2013.01); *G02B 1/14* (2015.01)

(58) Field of Classification Search
None
See application file for complete search history.

(56) References Cited

U.S. PATENT DOCUMENTS

| 4,529,659 | A | * | 7/1985 | Hoshino | ................ | G11B 5/725 360/134 |
| 4,696,845 | A | * | 9/1987 | Yanagisawa | ........... | G11B 5/725 427/128 |

(Continued)

FOREIGN PATENT DOCUMENTS

| CN | 105175713 A |   | 12/2015 |   |   |
| JP | 11092177 A  | * | 4/1999  | ............. | C03C 17/30 |

(Continued)

OTHER PUBLICATIONS

Datasheet for DuPont Krytox Aerospace Grade Oils and Greases, 4 pages, 2012. (Year: 2012).*

(Continued)

*Primary Examiner* — Robert S Loewe
(74) *Attorney, Agent, or Firm* — Harness, Dickey & Pierce, P.L.C (57) ABSTRACT

Disclosed are a surface coating material, a film formed from the surface coating material, a stacked structure the film, and a display device including the film and/or stacked structure. The surface coating material may include a plurality of fluorine-containing silicon compounds, wherein each of fluorine-containing silicon compounds may include a fluorine-containing (poly)ether moiety, a hydrolysable silane moiety, and a linking group between the fluorine-containing (poly)ether moiety and the hydrolysable silane moiety. The linking group may be configured to form a non-covalent interaction between adjacent molecules.

24 Claims, 4 Drawing Sheets

(56) References Cited

U.S. PATENT DOCUMENTS

| | | | | |
|---|---|---|---|---|
| 5,093,211 | A * | 3/1992 | Kudo | G11B 5/72 428/421 |
| 5,274,159 | A * | 12/1993 | Pellerite | B01F 17/0071 556/485 |
| 5,741,593 | A * | 4/1998 | Kondo | G11B 5/725 428/422 |
| 5,820,964 | A * | 10/1998 | Nakakawaji | G11B 5/725 428/833 |
| 6,277,485 | B1 * | 8/2001 | Invie | C09D 183/12 428/336 |
| 6,635,353 | B2 * | 10/2003 | Hage | C08G 77/54 428/412 |
| 6,991,826 | B2 * | 1/2006 | Pellerite | C08G 65/226 427/164 |
| 9,637,650 | B2 * | 5/2017 | Murotani | C23C 14/12 |
| 9,644,115 | B2 | 5/2017 | Yamane et al. | |
| 2002/0090515 | A1 * | 7/2002 | Pellerite | C09D 171/02 428/406 |
| 2002/0192380 | A1 * | 12/2002 | Elsbernd | C08G 65/336 427/314 |
| 2003/0113555 | A1 * | 6/2003 | Pellerite | C08G 65/337 428/447 |
| 2008/0220264 | A1 * | 9/2008 | Iyer | C09D 4/00 428/447 |
| 2009/0061039 | A1 * | 3/2009 | Zhang | B82Y 10/00 425/436 R |
| 2010/0316868 | A1 * | 12/2010 | David | C23C 28/00 428/336 |
| 2012/0231297 | A1 * | 9/2012 | Sugiura | C07D 251/54 428/810 |
| 2013/0108876 | A1 * | 5/2013 | Komori | C08G 65/007 428/421 |
| 2014/0302332 | A1 * | 10/2014 | Murotani | B05D 1/02 428/447 |
| 2015/0275046 | A1 | 10/2015 | Yamane et al. | |

FOREIGN PATENT DOCUMENTS

| | | |
|---|---|---|
| JP | 2000009906 A | 1/2000 |
| JP | 2014037326 A | 2/2014 |
| WO | WO-9937720 A1 | 7/1999 |
| WO | WO-03044075 A1 | 5/2003 |

OTHER PUBLICATIONS

Machine translation of JP-11092177, translation generated Nov. 2020, 14 pages. (Year: 2020).*

* cited by examiner

SURFACE COATING MATERIAL AND FILM AND STACKED STRUCTURE AND DISPLAY DEVICE

CROSS-REFERENCE TO RELATED APPLICATION

This application claims priority to and the benefit of Korean Patent Application No. 10-2018-0096657 filed in the Korean Intellectual Property Office on Aug. 20, 2018, the entire contents of which are incorporated herein by reference.

BACKGROUND

1. Field

A surface coating material, a film, a stacked structure, and a display device are disclosed.

2. Description of Related Art

A portable electronic device, such as a smart phone or a tablet PC, may include a functional layer having various functions. Recently, as a touch screen panel recognizing a contact position using a finger or a tool is universalized, a functional layer may be applied on the surface of a display panel in order to improve a surface slipping property and a sense of touch of a touch screen panel. However, such a functional layer has weak durability and may be easily lost or destroyed by frequent contact so that its function may be rapidly lost.

SUMMARY

An embodiment provides a surface coating material capable of improving durability.

Another embodiment provides a film capable of improving durability.

Yet another embodiment provides a stacked structure including the film.

Still another embodiment provides a display device including the film or the stacked structure.

According to an embodiment, a surface coating material includes a plurality of fluorine-containing silicon compounds. Each of the plurality fluorine-containing silicon compounds may include a fluorine-containing (poly)ether moiety, a hydrolysable silane moiety, and a linking group between the fluorine-containing (poly)ether moiety and the hydrolysable silane moiety. The linking group may be configured to form a non-covalent interaction between adjacent molecules.

In some embodiments, the linking group may include at least one of a hydrogen-bondable functional group and a zwitterion.

In some embodiments, the hydrogen-bondable functional group may include one of $C(=O)NR^d$, $OC(=O)NR^e$, $OC(=O)NR^fS(=O)$, $OC(=O)NR^gS(=O)O$, or a combination thereof, and the zwitterion may include a cation and an anion. The cation may be selected from $NH_3^+$, $NH_2R^{h+}$, and $NHR^iR^{j+}$. The anion may be selected from $CO^-$, $C(=O)O^-$, $OC(=O)^-$, $SO_3^-$, and $PO_3^{2-}$, wherein $R^d$ to $R^j$ may independently be one of hydrogen, a substituted or unsubstituted C1 to C20 alkyl group, a substituted or unsubstituted C6 to C20 aryl group, or a combination thereof.

In some embodiments, the plurality of fluorine-containing silicon compounds may be represented by Chemical Formula 1.

[Chemical Formula 1]

In Chemical Formula 1,

PF may be a fluorine-containing (poly)ether moiety, $R^a$, $R^b$, and $R^c$ may independently be one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group, IN may be a linking group including at least one of a hydrogen-bondable functional group and a zwitterion, $L^1$ and $L^2$ may independently be one of a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 may each independently be an integer ranging from 0 to 3.

In some embodiments, the PF of Chemical Formula 1 may be perfluoro(poly)ether.

In some embodiments, the PF of Chemical Formula 1 may be represented by $CF_3O(CF_2CF_2O)_n(CF_2O)_mCF_2$ (wherein n and m are independently an integer ranging from 1 to 30).

In some embodiments, the IN of Chemical Formula 1 may include one of $C(=O)NR^d$, $OC(=O)NR^e$, $OC(=O)NR^fS(=O)$, $OC(=O)NR^gS(=O)O$, or a combination thereof, wherein $R^d$ $R^g$ may independently be one of hydrogen, a substituted or unsubstituted C1 to C20 alkyl group, a substituted or unsubstituted C6 to C20 aryl group, or a combination thereof.

In some embodiments, the IN of Chemical Formula 1 may include a cation and an anion. The cation may be selected from $NH_3^+$, $NH_2R^{h+}$ and $NHR^iR^{j+}$. The anion may be selected from $CO^-$, $C(=O)O^-$, $OC(=O)^-$, $SO_3^-$, and $PO_3^{2-}$, wherein $R^h$ to $R^j$ may independently be one of hydrogen, a substituted or unsubstituted C1 to C20 alkyl group, a substituted or unsubstituted C6 to C20 aryl group, or a combination thereof.

According to another embodiment, a film includes a condensation polymerization product of a plurality of fluorine-containing silicon compounds. Each of the plurality of fluorine-containing silicon compounds may include a fluorine-containing (poly)ether moiety, a hydrolysable silane moiety, and a linking group between the fluorine-containing (poly)ether moiety and the hydrolysable silane moiety. The linking group may be configured to form a non-covalent interaction between adjacent molecules.

In some embodiments, the linking group may include at least one of a hydrogen-bondable functional group and a zwitterion.

In some embodiments, the hydrogen-bondable functional group may include one of $C(=O)NR^d$, $OC(=O)NR^e$, $OC(=O)NR^fS(=O)$, $OC(=O)NR^gS(=O)O$, or a combination thereof. The zwitterion may include a cation and an anion. The cation may be selected from $NH_3^+$, $NH_2R^{h+}$ and $NHR^iR^{j+}$. The anion may be selected from $CO^-$, $C(=O)O^-$, $OC(=O)^-$, $SO_3^-$, and $PO_3^{2-}$. $R^d$ to $R^j$ may independently be one of hydrogen, a substituted or unsubstituted C1 to C20 alkyl group, a substituted or unsubstituted C6 to C20 aryl group, or a combination thereof.

In some embodiments, the plurality of fluorine-containing silicon compounds may be represented by Chemical Formula 1.

[Chemical Formula 1]

In Chemical Formula 1,

PF may be a fluorine-containing (poly)ether moiety, $R^a$, $R^b$, and $R^c$ may independently be one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group, IN may be a linking group including at least one of a hydrogen-bondable functional group and a zwitterion, $L^1$ and $L^2$ may independently be one of a substituted or unsubstituted C1 to C20 alkylene group, a substituted or unsubstituted C6 to C20 arylene group, C1 to C20 oxyalkylene group, or a combination thereof, and p1 and p2 may each independently be an integer ranging from 0 to 3.

In some embodiments, the PF of Chemical Formula 1 may be perfluoro(poly)ether.

In some embodiments, the PF of Chemical Formula 1 may be represented by $CF_3O(CF_2CF_2O)_n(CF_2O)_mCF_2$ (n and m are independently an integer ranging from 1 to 30).

In some embodiments, the IN of Chemical Formula 1 may include one of $C(=O)NR^d$, $OC(=O)NR^e$, $OC(=O)NR^fS(=O)$, $OC(=O)NR^gS(=O)O$, or a combination thereof, wherein $R^d$ to $R^g$ may independently be one of hydrogen, a substituted or unsubstituted C1 to C20 alkyl group, a substituted or unsubstituted C6 to C20 aryl group, or a combination thereof.

In some embodiments, the IN of Chemical Formula 1 may include a cation and an anion. The cation may be selected from $NH_3^+$, $NH_2R^{h+}$, and $NHR^iR^{j+}$. The anion may be selected from $CO^-$, $C(=O)O^-$, $OC(=O)^-$, $SO_3^-$, and $PO_3^{2-}$, wherein $R^h$ to $R^j$ may independently be one of hydrogen, a substituted or unsubstituted C1 to C20 alkyl group, a substituted or unsubstituted C6 to C20 aryl group, or a combination thereof.

In some embodiments, the film may be a coated film or a deposited film.

According to another embodiment, a stacked structure includes a substrate and the film.

According to another embodiment, a display device includes the film or the stacked structure.

According to an embodiment, a film may include a condensation polymerization product of a plurality of fluorine-containing silicon compounds represented by Chemical Formula 1, and a molecular weight of one or more of the plurality of fluorine-containing silicon compounds may be in a range of about 1,000 Da to about 10,000 Da.

[Chemical Formula 1]

In Chemical Formula 1,

PF may be a fluorine-containing (poly)ether moiety,

$R^a$, $R^b$, and $R^c$ may independently be one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group, IN may be a linking group including at least one of a hydrogen-bondable functional group and a zwitterion, $L^1$ and $L^2$ may independently be one of a substituted or unsubstituted C1 to C20 alkylene group, a substituted or unsubstituted C6 to C20 arylene group, C1 to C10 oxyalkylene, or a combination thereof, and p1 and p2 may independently be an integer ranging from 0 to 3.

In some embodiments, the one of more of the plurality of fluorine-containing silicon compounds are represented by Chemical Formula 1A.

[Chemical Formula 1A],

In Chemical Formula 1A, n and m may each independently an integer ranging from 1 to 30, q and r may each independently be an integer in a range from 1 to 5, p1 and p2 may independently be an integer ranging from 0 to 3, and $R^a$, $R^b$, and $R^c$ may independently be one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group, and IN may be a linking group including at least one of a hydrogen-bondable functional group and a zwitterion.

In some embodiments, the IN of Chemical Formula 1A may include one of $C(=O)NR^d$, $OC(=O)NR^e$, $OC(=O)NR^fS(=O)$, $OC(=O)NR^gS(=O)O$, or a combination thereof. $R^d$ to $R^g$ may independently be one of hydrogen, a substituted or unsubstituted C1 to C20 alkyl group, a substituted or unsubstituted C6 to C20 aryl group, or a combination thereof.

In some embodiments, the IN of Chemical Formula 1A may include a cation and an anion. The cation may be selected from $NH_3^+$, $NH_2R^{h+}$, and $NHR^iR^{j+}$. The anion may be selected from $CO^-$, $C(=O)O^-$, $OC(=O)^-$, $SO_3^-$, and $PO_3^{2-}$. $R^h$ to $R^j$ may independently be one of hydrogen, a substituted or unsubstituted C1 to C20 alkyl group, a substituted or unsubstituted C6 to C20 aryl group, or a combination thereof.

According to another embodiment, a stacked structure includes a substrate and the film. The film may be on the substrate.

Durability of the functional layer may be improved.

DETAILED DESCRIPTION

Example embodiments of the present disclosure will hereinafter be described in detail, and may be easily performed by a person having an ordinary skill in the related art. However, actually applied structures may be embodied in many different forms, and are not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numeral throughout the specification.

As used herein, when a definition is not otherwise provided, 'substituted' may refer to replacement of a hydrogen atom of a compound by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

As used herein, when a definition is not otherwise provided, 'hetero' may refer to one including 1 to 4 heteroatoms selected from N, O, S, Se, Te, Si, and P.

Hereinafter, 'combination' may refer to a mixture of two or more and a stack structure of two or more.

Expressions such as "at least one of," when preceding a list of elements (e.g., A, B, and C), modify the entire list of elements and do not modify the individual elements of the list. For example, "at least one of A, B, and C," "at least one of A, B, or C," "one of A, B, C, or a combination thereof," and "one of A, B, C, and a combination thereof," respectively, may be construed as covering any one of the following combinations: A; B; A and B; A and C; B and C; and A, B, and C."

Hereinafter, a surface coating material according to an embodiment is described.

The surface coating material according to an embodiment includes a plurality of fluorine-containing silicon compounds. The plurality of fluorine-containing silicon compounds may be a monomer, an oligomer, and/or a polymer.

The plurality of fluorine-containing silicon compounds may respectively have a fluorine-containing (poly)ether moiety and a hydrolysable silane moiety at each terminal end and accordingly, be aligned in one direction due to a surface energy difference of both terminal ends.

Each of the fluorine-containing silicon compounds may include a fluorine-containing (poly)ether moiety at one terminal end, a hydrolysable silane moiety at the other terminal end, and a linking group between the fluorine-containing (poly)ether moiety and the hydrolysable silane moiety.

The fluorine-containing (poly)ether moiety may be for example a (poly)ether having at least one fluorine, for example perfluoro(poly)ether. The fluorine-containing (poly)ether moiety may be for example represented by $CF_3O(CF_2CF_2O)_n(CF_2O)_mCF_2$ (wherein n and m are independently an integer ranging from 1 to 30), but is not limited thereto.

The hydrolysable silane moiety may be silane substituted with at least one hydrolysable functional group, for example silane substituted with at least one substituted or unsubstituted C1 to C20 alkoxy group, a halogen, or a hydroxy group. The hydrolysable silane moiety may be bound to a substrate or a lower layer by a hydrolysis and/or condensation polymerization reaction during a coating or depositing process.

The linking group may be disposed between the fluorine-containing (poly)ether moiety and the hydrolysable silane moiety and may form a non-covalent interaction with adjacent molecules. The non-covalent interaction is not a covalent bond and may be for example a hydrogen bond and/or an ionic bond.

The linking group capable of forming a hydrogen bond may have for example a hetero atom such as nitrogen, oxygen, and/or sulfur and may be for example $-C(=O)NR^d$, $OC(=O)NR^e$, $OC(=O)NR^fS(=O)$, $OC(=O)NR^gS(=O)$O, or a combination thereof (wherein $R^d$ to $R^g$ are independently hydrogen, a substituted or unsubstituted C1 to C20 alkyl group, a substituted or unsubstituted C6 to C20 aryl group, or a combination thereof), but is not limited thereto.

The linking group capable of forming an ionic bond may include for example zwitterion, for example a cation and an anion. The cation may be for example selected from $NH_3^+$, $NH_2R^{h+}$, and $NHR^iR^{j+}$ (wherein $R^h$ to $R^j$ are independently hydrogen, a substituted or unsubstituted C1 to C20 alkyl group, a substituted or unsubstituted C6 to C20 aryl group, or a combination thereof) and the anion may be for example selected from $CO^-$, $C(=O)O^-$, $OC(=O)^-$, $SO_3^-$, and $PO_3^{2-}$, but is not limited thereto. The cation and the anion of the linking group of the fluorine-containing silicon compounds may form an ionic bond with the anion and the cation of the linking group of adjacent fluorine-containing silicon compounds, respectively.

For example, the linking group may be a linking group capable of forming an ionic bond.

For example, the linking group may be a linking group capable of forming a hydrogen bond.

For example, the linking group may be a linking group capable of a hydrogen bond and an ionic bond.

For example, the fluorine-containing silicon compounds may be represented by Chemical Formula 1.

$$PF\text{-}(L^1)_{p1}\text{-}IN\text{-}(L^2)_{p2}\text{-}SiR^aR^bR^c \qquad [\text{Chemical Formula 1}]$$

In Chemical Formula 1,

PF is a fluorine-containing (poly)ether moiety, $R^a$, $R^b$, and $R^c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is one of a substituted or unsubstituted C1 to C20 alkoxy group, a halogen, or a hydroxy group, IN is a linking group including at least one of a hydrogen-bondable functional group and a zwitterion, $L^1$ and $L^2$ are independently one of a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are independently an integer ranging from 0 to 3.

For example, PF may be for example perfluoro(poly)ether, and may be for example represented by $CF_3O(CF_2CF_2O)_n(CF_2O)_mCF_2$ (wherein n and m are independently an integer ranging from 1 to 30).

For example, one of $R^a$, $R^b$, and $R^c$ may be one of a substituted or unsubstituted C1 to C20 alkoxy group, a halogen, or a hydroxy group.

For example, two of $R^a$, $R^b$, and $R^c$ may be one of a substituted or unsubstituted C1 to C20 alkoxy group, a halogen, or hydroxy group.

For example, $R^a$, $R^b$, and $R^c$ may independently be one of a substituted or unsubstituted C1 to C20 alkoxy group, a halogen, or hydroxy group.

For example, IN may be a hydrogen-bondable functional group and may be for example one of C(=O)NR$^d$, OC(=O)NR$^e$, OC(=O)NR$^f$S(=O), OC(=O)NR$^g$S(=O)O, or a combination thereof (wherein $R^d$ to $R^g$ are independently one of hydrogen, a substituted or unsubstituted C1 to C20 alkyl group, a substituted or unsubstituted C6 to C20 aryl group, or a combination thereof).

For example, IN may be a zwitterion, and may include for example a cation selected from NH$_3^+$, NH$_2$R$^{h+}$, and NHR$^i$R$^{j+}$ (wherein $R^h$ to $R^j$ are independently hydrogen, a substituted or unsubstituted C1 to C20 alkyl group, a substituted or unsubstituted C6 to C20 aryl group, or a combination thereof) and an anion selected from CO$^-$, C(=O)O$^-$, OC(=O)$^-$, SO$_3^-$, and PO$_3^{2-}$.

For example, IN may include a hydrogen-bondable functional group and a zwitterion and may include for example one of C(=O)NR$^d$, OC(=O)NR$^e$, OC(=O)NR$^f$S(=O), OC(=O)NR$^g$S(=O)O, or a combination thereof (wherein $R^d$ to $R^g$ are independently one of hydrogen, a substituted or unsubstituted C1 to C20 alkyl group, a substituted or unsubstituted C6 to C20 aryl group, or a combination thereof), a cation selected from NH$^{3+}$, NH$_2$Rh$^+$, and NHR$^i$R$^{j+}$ (wherein $R^h$ to $R^j$ are independently one of hydrogen, a substituted or unsubstituted C1 to C20 alkyl group, a substituted or unsubstituted C6 to C20 aryl group, or a combination thereof), and an anion selected from CO$^-$, C(=O)O$^-$, OC(=O)$^-$, SO$_3$, and PO$_3^{2-}$.

For example, L$^1$ and L$^2$ may independently be one of a substituted or unsubstituted methylene group, a substituted or unsubstituted ethylene group, a substituted or unsubstituted propylene group, a substituted or unsubstituted butylene group, a substituted or unsubstituted pentylene group, a substituted or unsubstituted hexylene group, a substituted or unsubstituted phenylene group, a substituted or unsubstituted biphenylene group, a substituted or unsubstituted naphthylene group, a substituted or unsubstituted oxymethylene group, a substituted or unsubstituted oxyethylene group, a substituted or unsubstituted oxypropylene group, or a combination thereof.

For example, the fluorine-containing silicon compounds may be represented by Chemical Formula 1A.

[Chemical Formula 1A]

In Chemical Formula 1A,

IN, $R^a$, $R^b$, $R^c$, n, m, p1, and p2 are the same as described above, and q and r are independently an integer ranging from 1 to 5.

For example, the fluorine-containing silicon compounds may be represented by Chemical Formula 1A-1.

[Chemical Formula 1A]

In Chemical Formula 1A-1, $R^a$, $R^b$, $R^c$, n, m, p1, p2, q, and r are the same as described above.

For example, the fluorine-containing silicon compounds may be represented by Chemical Formula 1A-2.

[Chemical Formula 1A-2]

In Chemical Formula 1A-2, $R^a$, $R^b$, n, m, p1, p2, q, and r are the same as described above.

A molecular weight of the fluorine-containing silicon compounds may be about 1,000 Da to about 10,000 Da.

The surface coating material according to an embodiment includes the plurality of fluorine-containing silicon compounds respectively including the linking group capable of forming a non-covalent interaction with adjacent molecules between the fluorine-containing (poly)ether moiety and the hydrolysable silane moiety and accordingly, may firmly maintain the interaction among adjacent molecular chains and thus reduce or prevent damage and/or destruction of the bonding of the plurality of fluorine-containing silicon compounds due to frequent frictions. Accordingly, the surface coating material may not be easily worn away due to the frequent frictions but have reinforced durability.

The surface coating material may be formed into a film by a coating through a solution process or by deposition through a dry process. Accordingly, the film may be a coated film or a deposited film. The coated film may be obtained by coating a solution including the surface coating material dissolved or dispersed in a solvent, for example, in a method of spin coating, slit coating, inkjet printing, or dipping and then, drying it. The deposited film may be obtained, for example, in a method of a thermal deposition, a vacuum deposition, or a chemical vapor deposition (CVD).

The film may be formed on a substrate, which may be, for example a glass substrate, a metal plate, or a polymer film but is not limited thereto.

The film may include a condensation/polymerization product of the plurality of fluorine-containing silicon compounds, and herein, each of the fluorine-containing silicon compounds may include the fluorine-containing (poly)ether moiety, the hydrolysable silane moiety, and the linking group disposed between the fluorine-containing (poly)ether moiety and the hydrolysable silane moiety and forming a non-covalent interaction among adjacent molecules as described above.

Herein, the hydrolysable silane moiety of the fluorine-containing silicon compounds is bound on the substrate side, while the fluorine-containing (poly)ether moiety may be aligned on the surface (air) side. The plurality of fluorine-containing silicon compounds may be substantially aligned along a vertical direction.

The film has the fluorine-containing (poly)ether moiety on the surface and thus may have a high contact angle. Accordingly, the film ay have sufficient slip and water repellency. The film may have, for example, a contact angle of greater than or equal to about 100°, for example, within the range, greater than or equal to about 105°, for example, greater than or equal to about 110°, and for example, greater than or equal to about 112°. Herein, the contact angle may be measured by using a Sessile drop technique. The contact angle may be measured by using water as a liquid and a Drop shape analyzer (DSA100, KRUSS, Germany) and dropping a predetermined water (about 3 ul) on the film.

The film may maintain a high contact angle after frequent frictions. Durability of the film may be examined through a change of the contact angle after a plurality of frictions. For example, the film may have a contact angle change of less than or equal to about 20 degrees, less than or equal to about 18 degrees, less than or equal to about 15 degrees, less than or equal to about 12 degrees, and less than or equal to about 10 degrees after the 5000 times' abrasion test with an eraser under a load of about 1 kg. For example, the film may have a contact angle of greater than or equal to about 100 degrees after the abrasion test with an eraser under a load of about 1 kg.

The substrate and the film may include a stacked structure.

The stacked structure may further include at least one layer between the substrate and the film.

The stacked structure may be a transparent film, for example a transparent flexible film.

For example, the film or the stacked structure may be attached on the display panel. Herein, the display panel and the film or the stacked structure may be directly bonded or may be bonded by interposing an adhesive. The display panel may be for example a liquid crystal panel or an organic light emitting panel, but is not limited thereto. The film or the stacked structure may be disposed on the side of an observer.

Figure 1:
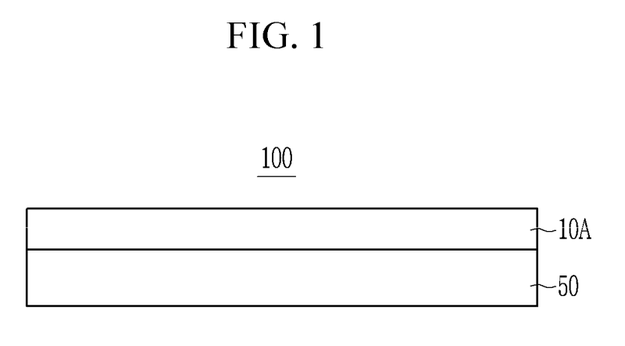
FIG. 1 is a cross-sectional view showing a display device according to an embodiment.

FIG. 1 is a cross-sectional view of a display device according to an embodiment.

Referring to FIG. 1, a display device 100 according to an embodiment includes a display panel 50 and a functional film 10A.

The display panel 50 may be for example an organic light emitting panel or a liquid crystal panel, for example a bendable display panel, a foldable display panel, or a rollable display panel.

The functional film 10A may include the film or stacked structure and may be disposed on the side of an observer. Another layer may be further disposed between the display panel 50 ad the functional film 10A and may include for example a monolayer or plural layers of polymer layer (not shown) and optionally a transparent adhesive layer (not shown).

Figure 2:
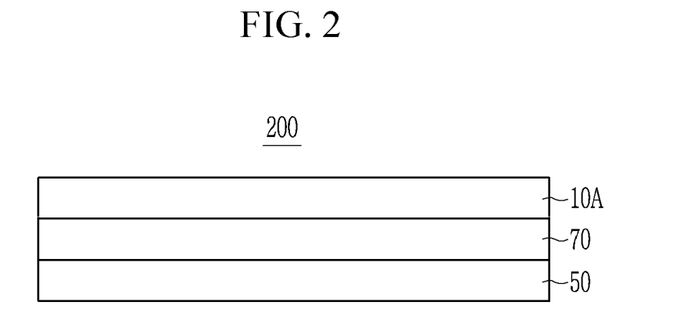
FIG. 2 is a cross-sectional view showing a display device according to another embodiment.

FIG. 2 is a cross-sectional view of a display device according to another embodiment.

Referring to FIG. 2, a display device 200 according to the present embodiment includes a display panel 50, a functional film 10A, and a touch screen panel 70 disposed between the display panel 50 and the functional film 10A.

The display panel 50 may be for example an organic light emitting panel or a liquid crystal panel, for example a bendable display panel, a foldable display panel, or a rollable display panel.

The functional film 10A may include the film or the stacked structure and may be disposed on the side of an observer.

The touch screen panel 70 may be disposed adjacent to each of the functional film 10A and the display panel 50 to recognize the touched position and the position change when is touched by a human hand or an object through the functional film 10A and then to output a touch signal. The driving module (not shown) may monitor a position where is touched from the output touch signal; recognize an icon marked at the touched position, and control to carry out functions corresponding to the recognized icon, and the function performance results are displayed on the display panel 50.

Another layer may be further disposed between the touch screen panel 70 and functional film 10A and may include for example a monolayer or plural layers of polymer layer (not shown) and optionally a transparent adhesive layer (not shown).

Another layer may be further interposed between the touch screen panel 70 and the display panel 50 and may include for example a monolayer or plural layers of polymer layer (not shown) and optionally a transparent adhesive layer (not shown).

The functional film 10A including the film or the stacked structure may be applied to a variety of electronic devices such as a display device, for example a smart phone, a tablet PC, a camera, a touch screen device, and so on, but is not limited thereto.

Hereinafter, the embodiments are illustrated in more detail with reference to examples. However, these examples are non-limiting, and the present disclosure is not limited thereto.

SYNTHESIS EXAMPLES

Synthesis Example 1

1A-1a

One equivalent of perfluoropolyether methylester (Mw: 3500 to 4000 Da) and 1.5 equivalent of aminopropyl trimethoxysilane are added to a Novec-7200 solvent (3M), and the mixture is stirred at room temperature for 24 hours. Subsequently, after removing non-reactants with a rotatory pump, a product therefrom is three times washed with the Novec-7200 solvent to obtain a compound represented by Chemical Formula 1A-1a (Mw: 4000).

Figure 3:
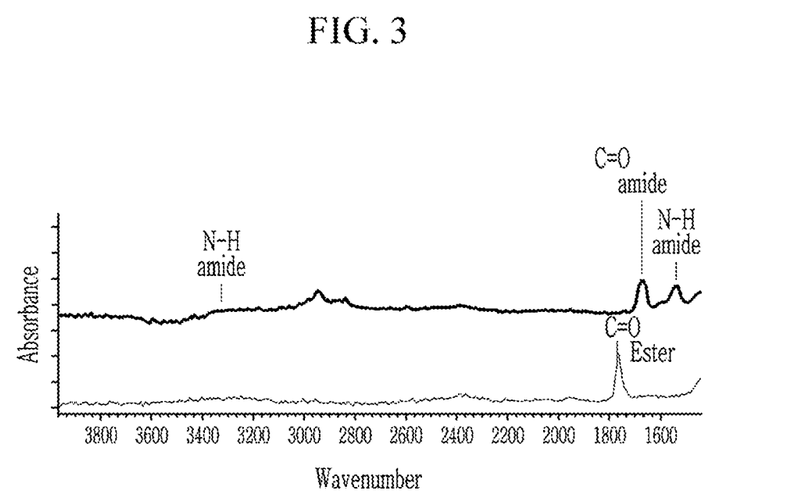
FIG. 3 is a FT-IR graph showing the compound obtained in Synthesis Example 1.

FIG. 3 is a FT-IR graph showing the compound obtained in Synthesis Example 1.

Synthesis Example 2

1A-2a

One equivalent of perfluoropolyether carboxylic acid (Mw: 3500 to 4000 Da) and 1.5 equivalent of aminopropyl trimethoxysilane are added to a Novec-7200 solvent (3M), and the mixture is stirred at room temperature for 24 hours. Subsequently, after removing non-reactants with a rotatory pump, a product therefrom is three times washed with the Novec-7200 solvent to obtain a compound represented by Chemical Formula 1A-2a (Mw: 4000).

Figure 4:
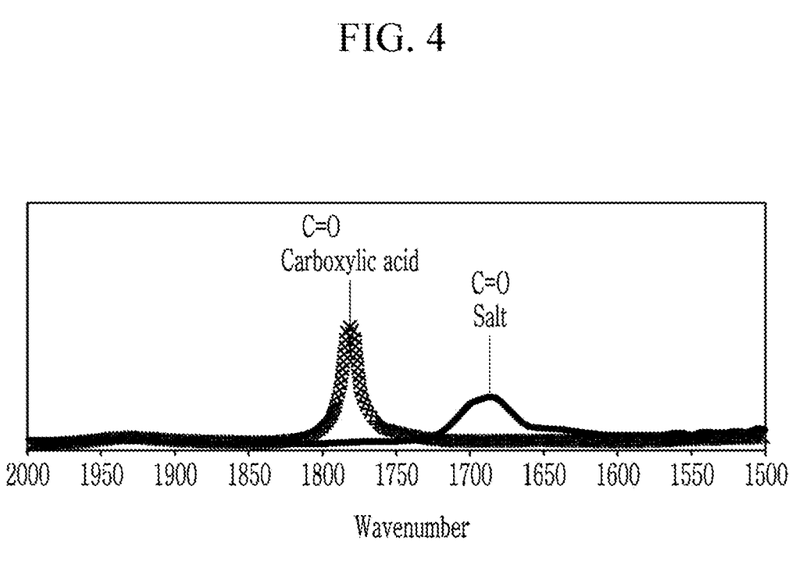
FIG. 4 is a FT-IR graph showing the compound obtained in Synthesis Example 2.

FIG. 4 is a FT-IR graph showing the compound obtained in Synthesis Example 2.

EXAMPLES

Example 1

The compound according to Synthesis Example 1 is added in a concentration of 20 wt % to a Novec-7200 solvent (3M) to prepare a composition. Subsequently, the composition is vacuum-deposited on a glass substrate on which $SiO_2$ is thermally deposited to be 20 nm thick.

Example 2

A film is formed according to the same method as Example 1 except for using the compound according to Synthesis Example 2 instead of the compound according to Synthesis Example 1.

Comparative Example 1

A film is formed according to the same method as Example 1 except for using a compound represented by Chemical Formula A (Daikin) instead of the compound according to Synthesis Example 1.

[Chemical Formula A]

(m, n = 5)

Evaluation
Evaluation I

Durability of each film according to Examples 1 and 2 and Comparative Example 1 is evaluated.

The durability of the film is evaluated by a contact angle change due to a friction.

An initial contact angle is measured by dropping water on the film with a Drop shape analyzer (DSA100, KRUSS, Germany) and using a Sessile drop technique. Subsequently, the film is 5000 times rubbed by using a 6 mm-wide polyurethane rubber eraser under a load of 1 kg, and then, a contact angle thereof is measured again in the same method.

The results are shown in Table 1.

TABLE 1

|  | Initial contact angle (°) | Contact angle (°) after 5000 times rubbed with eraser | Contact angle change (°) |
|---|---|---|---|
| Example 1 | 118.5 | 116.2 | −2.3 |
| Example 2 | 113.1 | 103.4 | −9.7 |

TABLE 1-continued

|  | Initial contact angle (°) | Contact angle (°) after 5000 times rubbed with eraser | Contact angle change (°) |
|---|---|---|---|
| Comparative Example 1 | 118.1 | 97 | −21.1 |

Referring to Table 1, the films according to Examples 1 and 2 show a small contact angle change and sufficient durability against a friction compared with the film according to Comparative Example 1.

Evaluation II

Mechanical strength of the films according to Examples 1 and 2 and Comparative Example 1 is evaluated.

The mechanical strength is evaluated by using tensile strength and a maximum pulling force obtained by calculating a molecular dynamic (Program: LAMMPS/IFF).

The results are shown in Table 2.

TABLE 2

|  | Pulling Strength @ strain = 1.0 MPa | Pulling force (kcal/mole/$A^3$) |
|---|---|---|
| Example 1 | 450-650 | — |
| Example 2 | 360-600 | 0.11 |
| Comparative Example 1 | 150-350 | 0.09 |

Referring to Table 2, the films according to Examples 1 and 2 show higher mechanical strengths compared with the film according to Comparative Example 1.

While some example embodiments have been particularly shown and described, it will be understood by one of ordinary skill in the art that variations in form and detail may be made therein without departing from the spirit and scope of the claims.

What is claimed is:

1. A surface coating material, comprising:
   a plurality of fluorine-containing silicon compounds represented by Chemical Formula 1, $$PF\text{-}(L^1)_{p1}\text{-}IN\text{-}(L^2)_{p2}\text{-}SiR^aR^bR^c \quad \text{[Chemical Formula 1]}$$

wherein, in Chemical Formula 1,
   PF is a fluorine-containing (poly)ether moiety,
   $R^a$, $R^b$, and $R^c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group,
   IN is a linking group including at least one of a hydrogen-bondable functional group and a zwitterion,
   the linking group being configured to form a non-covalent interaction between adjacent molecules,
   $L^1$ and $L^2$ are independently one of a substituted or unsubstituted C1 to C20 alkylene group, a substituted or unsubstituted C6 to C20 arylene group, a substituted or unsubstituted C1 to C20 oxyalkylene group, or a combination thereof,
   p1 and p2 are independently an integer ranging from 1 to 3, and
   the IN of Chemical Formula 1 includes one of OC(=O)NR$^f$S(=O), OC(=O)NR$^g$S(=O)O, or a combination thereof, wherein R$^f$, and R$^g$ independently are one of hydrogen, a substituted or unsubstituted C1 to C20 alkyl group, a substituted or unsubstituted C6 to C20 aryl group, or a combination thereof, or the IN of Chemical Formula 1 includes a cation and an anion, the cation being selected from $NH_{3+}$, $NH_2R^{h+}$, and $NHR^iR^{j+}$, the anion being selected from CO—, C(=O)O—, OC(=O)—, $SO_{3-}$, and $PO_3^{2-}$, and $R^h$ to $R^j$ being independently one of hydrogen, a substituted or unsubstituted C1 to C20 alkyl group, a substituted or unsubstituted C6 to C20 aryl group, or a combination thereof.

2. The surface coating material of claim 1, wherein the IN of Chemical Formula 1 includes one of OC(=O)NR$^f$S(=O), OC(=O)NR$^g$S(=O)O, or a combination thereof, and $R^f$, and $R^g$ are independently one of a substituted or unsubstituted C1 to C20 alkyl group, a substituted or unsubstituted C6 to C20 aryl group, or a combination thereof.

3. The surface coating material of claim 1, wherein the IN of Chemical Formula 1 includes the cation and the anion, the cation is selected from $NH_{3+}$, $NH_2R^{h+}$, and $NHR^iR^{j+}$, and the anion is selected from CO—, C(=O)O—, OC(=O)—, $SO^{3-}$, and $PO_3^{2-}$, and $R^h$ to $R^j$ are independently one of hydrogen, a substituted or unsubstituted C1 to C20 alkyl group, a substituted or unsubstituted C6 to C20 aryl group, or a combination thereof.

4. The surface coating material of claim 1, wherein the PF of Chemical Formula 1 is perfluoro(poly)ether.

5. A film comprising:
a condensation polymerization product of the surface coating material of claim 1, wherein the surface coating material is the a-plurality of fluorine-containing silicon compounds represented by Chemical Formula 1.

6. The film of claim 5, wherein
the IN of Chemical Formula 1 includes one of OC(=O)NR$^f$S(=O), OC(=O)NR$^g$S(=O) O, or a combination thereof, and $R^f$, and $R^g$ independently are one of a substituted or unsubstituted C1 to C20 alkyl group, a substituted or unsubstituted C6 to C20 aryl group, or a combination thereof.

7. The film of claim 5, wherein
the IN of Chemical Formula 1 includes the cation and the anion, the cation is selected from $NH_{3+}$, $NH_2R^{h+}$, and $NHR^iR^{j+}$, and the anion is selected from CO—, OC(=O)—, $SO_{3-}$, and $PO_3^{2-}$, and $R^h$ to $R^j$ are independently one of hydrogen, a substituted or unsubstituted C1 to C20 alkyl group, a substituted or unsubstituted C6 to C20 aryl group, or a combination thereof.

8. The film of claim 5, wherein the PF of Chemical Formula 1 is perfluoro(poly)ether.

9. The film of claim 5, wherein the film is a coated film or deposited film.

10. A stacked structure, comprising
a substrate, and
the film of claim 5 on the substrate.

11. A display device comprising:
the stacked structure of claim 10.

12. A display device comprising:
the film of claim 5.

13. The film of claim 5,
a molecular weight of one or more of the plurality of fluorine-containing silicon compounds is in a range of about 1,000 Da to about 10,000 Da.

14. The film of claim 13, wherein
the IN of Chemical Formula 1 includes the cation and the anion, the cation is selected from $NH_{3+}$, $NH_2R^{h+}$, and $NHR^iR^{j+}$, and the anion is selected from CO—, C(=O)O—, OC(=O)—, $SO_{3-}$, and $PO_3^{2-}$, and $R^h$ to $R^j$ are independently one of hydrogen, a substituted or unsubstituted C1 to C20 alkyl group, a substituted or unsubstituted C6 to C20 aryl group, or a combination thereof.

15. The film of claim 5, wherein
the IN of Chemical Formula 1 includes one of OC(=O)NR$^f$S(=O), OC(=o)NR$^g$S(=O)O, or a combination thereof, and $R^f$, and $R^g$ are independently one of hydrogen, a substituted or unsubstituted C1 to C20 alkyl group, a substituted or unsubstituted C6 to C20 aryl group, or a combination thereof.

16. A surface coating material, comprising:
a plurality of fluorine-containing silicon compounds represented by Chemical Formula 1, $$PF\text{-}(L^1)_{p1}\text{-}IN\text{-}(L^2)_{p2}\text{-}SiR^aR^bR^c \quad \text{[Chemical Formula 1]}$$

wherein, in Chemical Formula 1,
PF of is represented by $CF_3O(CF_2CF_2O)n(CF_2O)_mCF_2$,
n and m are each independently an integer ranging from 1 to 30, $R_a$, $R_b$, and $R_c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R_a$, $R_b$, and $R_c$ is a substituted or unsubstituted C1 to C20 alkoxy group, a halogen, or a hydroxy group, IN is a linking group including at least one of a hydrogen-bondable functional group and a zwitterion,
the linking group is configured to form a non-covalent interaction between adjacent molecules, $L^1$ and $L^2$ are independently one of a substituted or unsubstituted C1 to C20 alkylene group, a substituted or unsubstituted C6 to C20 arylene group, a substituted or unsubstituted C1 to C20 oxyalkylene group, or a combination thereof, p1 and p2 are independently an integer ranging from 1 to 3, and the IN of Chemical Formula 1 includes one of –C(=O)NR$^d$, OC(=O)NR$^f$S(=O), OC(=O)NR$^g$S(=O)O, or a combination thereof, wherein $R^d$, $R^f$, and $R^g$ independently are one of hydrogen, a substituted or unsubstituted C1 to C20 alkyl group, a substituted or unsubstituted C6 to C20 aryl group, or a combination thereof, or the IN of Chemical Formula 1 includes a cation and an anion, the cation being selected from $NH_{3+}$, $NH_2R^{h+}$, and $NHR^iR^{j+}$, the anion being selected from CO—, C(=O)O—, OC(=O)—, $SO_{3-}$, and $PO_3^{2-}$, and $R^h$ to $R^j$ being independently one of hydrogen, a substituted or unsubstituted C1 to C20 alkyl group, a substituted or unsubstituted C6 to C20 aryl group, or a combination thereof.

17. The surface coating material of claim 16 wherein the plurality of fluorine-containing silicon compounds are represented by Chemical Formula 1A-1:

[Chemical Formula 1A-2]

wherein, in Chemical Formula 1A-1,
$R^a$, $R^b$, and $R^c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group,
q and r are each independently an integer ranging from 1 to 5,
n and m are each independently an integer ranging from 1 to 30, and
p1 and p2 are independently an integer ranging from 1 to 3.

18. The surface coating material of claim 16 wherein the IN of Chemical Formula 1 is one of $C(=O)NR^d$, $OC(=O)NR^fS(=O)$, $OC(=O)NR^gS(=O)O$, or a combination thereof, and
$R^d$, $R^f$, and $R^g$ are independently one of hydrogen, a substituted or unsubstituted C1 to C20 alkyl group, a substituted or unsubstituted C6 to C20 aryl group, or a combination thereof.

19. A film comprising:
a condensation polymerization product of the surface coating material of claim 16, wherein
the surface coating material is the plurality of fluorine-containing silicon compounds represented by Chemical Formula 1.

20. The film of claim 19 wherein the plurality of fluorine-containing silicon compounds are represented by Chemical Formula 1A-1:

[Chemical Formula 1A-2]

wherein, in Chemical Formula 1A-1,
$R^a$, $R^b$, and $R^c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group,
q and r are each independently an integer ranging from 1 to 5,
n and m are each independently an integer ranging from 1 to 30, and
p1 and p2 are independently an integer ranging from 1 to 3.

21. The film of claim 20, wherein
the IN of Chemical Formula 1 is one of $C(=O)NR^d$, $OC(=O)NR^fS(=O)$, $OC(=O)NR^gS(=O)O$, or a combination thereof,
$R^d$, $R^f$, and $R^g$ are independently one of hydrogen, a substituted or unsubstituted C1 to C20 alkyl group, a substituted or unsubstituted C6 to C20 aryl group, or a combination thereof.

22. A stacked structure, comprising:
the film of claim 19; and
a substrate, wherein
the film is on the substrate.

23. The surface coating material of claim 16, wherein
the IN of Chemical Formula 1 includes the cation and the anion,
the cation is selected from $NH_{3+}$, $NH_2R^{h+}$, and $NHR^iR^{j+}$, and
the anion is selected from $CO-$, $C(=O)O-$, $OC(=O)-$, $SO_{3-}$, and $PO_3^{2-}$, and
$R^h$ to $R^j$ are independently one of hydrogen, a substituted or unsubstituted C1 to C20 alkyl group, a substituted or unsubstituted C6 to C20 aryl group, or a combination thereof.

24. A surface coating material, comprising:
a plurality of fluorine-containing silicon compounds represented by Chemical Formula 1,

[Chemical Formula 1]

wherein, in Chemical Formula 1,
PF is a fluorine-containing (poly)ether moiety,
$R^a$, $R^b$, and $R^c$ are independently one of hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, provided that at least one of $R^a$, $R^b$, and $R^c$ is a substituted or unsubstituted C1 to C20 alkoxy group, a halogen, or a hydroxy group,
$L^1$ and $L^2$ are independently one of a substituted or unsubstituted C1 to C20 alkylene group, a substituted or unsubstituted C6 to C20 arylene group, a substituted or unsubstituted C1 to C20 oxyalkylene group, or a combination thereof, and
p1 and p2 are independently an integer ranging from 0 to 3, wherein
the IN of Chemical Formula 1 includes a cation and an anion,
the cation is selected from $NH_{3+}$, $NH_2R^{h+}$, and $NHR^iR^{j+}$,
the anion is selected from $CO-$, $C(=O)O-$, $OC(=O)-$, $SO_{3-}$, and $PO_3^{2-}$,
Rh to Ri are independently one of hydrogen, a substituted or unsubstituted C1 to C20 alkyl group, a substituted or unsubstituted C6 to C20 aryl group, or a combination thereof.

* * * * *